United States Patent [19]

Lob

[11] 4,252,354
[45] Feb. 24, 1981

[54] SNOWMOBILE SUSPENSION

[75] Inventor: James P. Lob, Oconomowoc, Wis.

[73] Assignee: Deere & Company, Moline, Ill.

[21] Appl. No.: 69,909

[22] Filed: Aug. 27, 1979

[51] Int. Cl.$^3$ .............................................. B62B 13/08
[52] U.S. Cl. .................................. 280/21 R; 180/190; 267/52; 280/25
[58] Field of Search ................... 280/21 R, 16, 25, 26, 280/27, 669, 694, 699, 718; 180/190, 193; 267/52, 53, 160, 31

[56] References Cited

U.S. PATENT DOCUMENTS

| | | | |
|---|---|---|---|
| 550,800 | 12/1895 | McKinstry | 267/52 |
| 3,361,436 | 1/1968 | Williams | 280/16 |
| 3,482,849 | 12/1969 | Puetz | 280/21 R |
| 3,525,411 | 8/1970 | Hagen | 280/25 |
| 3,596,726 | 8/1971 | Takada | 280/21 R |
| 3,613,809 | 10/1971 | Chaumont | 280/21 R |
| 3,693,992 | 9/1972 | Piedboeuf | 280/26 |

*Primary Examiner*—David M. Mitchell

[57] ABSTRACT

An improved connection between the two steering posts and the steering skis at the forward end of a snowmobile which includes for each post and each ski a downwardly convexed leaf spring connected at its front and rear ends to the ski and bracket structure that connects the intermediate portion of the spring to the post. The bracket structure includes a pair of brackets, one of which is connected to a forward portion of the spring and the other of which is connected to a rearward portion of the spring so as to have a relatively long length of spring between the two portions. The two brackets have vertical walls that are disposed side-by-side and extend upwardly to be connected to a horizontal trunnion mounted or fixed to the lower end of the post.

9 Claims, 2 Drawing Figures

SNOWMOBILE SUSPENSION

BACKGROUND OF THE INVENTION

Conventionally, snowmobiles are supported at their forward ends by a pair of skis that are steerable by vertical posts and suitable linkage extending to a steering wheel or arm on the snowmobile. The lower ends of the steering posts are connected to the respective skis by means of leaf springs that are directly connected to the skis. Horizontal trunnions are connected to the lower ends of the posts. Generally, a bracket structure extends between the respective trunnion and the intermediate portion of the leaf spring and the bracket is clamped, bolted, welded, or otherwise fixed to the intermediate portion.

The bracket structure that connects the trunnion to the spring generally consists of a fore-and-aft elongated plate that fits or bears against the surface of the leaf spring and is normally bolted at opposite ends to the spring. One of the problems that exists with such a bracket mounting arrangement is that the portion of the spring between the ends of the bracket plate is not permitted to flex and consequently, the flex points on the spring occur at the front and rear ends of the bracket plate. Often, failure of the spring occurs at these points. The snowmobile normally goes over relatively rough terrain in generally unpopulated areas and consequently, considerable vibration occurs between the bracket structure and the spring. Therefore, it is desireable to eliminate such flex points if at all possible.

SUMMARY OF THE INVENTION

With the above in mind, it is the primary object of the invention to provide bracket structure that extends between the post trunnion and the spring which minimizes the effect of flex points on the spring and permits the intermediate portion of the spring, i.e., in the area directly below the post and trunnion, to flex vertically.

More specifically, it is the object of the present invention to provide first and second bracket structure that extends between the trunnion and the spring. One bracket structure includes a pair of fore-and-aft vertical walls on opposite sides of the spring which extend forwardly from the trunnion and are interconnected by a bight portion that underlies the spring at a distance forwardly of the trunnion. The walls are connected at their rear upper portions to a transverse pin or shaft that is received in the post trunnion. The second bracket structure has a bight portion that underlies the spring at a distance considerably rearwardly of the trunnion and has a pair of vertical walls on opposite sides of the spring that extend forwardly and upwardly to a forward upper portion that receives the transverse pin that extends through the post trunnion. The front and rear bight portions are bolted to the spring and the vertical walls suspend the spring at a vertical distance beneath the trunnion portion. Therefore, the intermediate portion of the spring between the two bight portions is permitted to flex vertically. Also, since the vertical wall portions of the two brackets are mounted upon a common pivot, the brackets themselves may pivot independently of one another and consequently, the spring portions that are connected to the respective brackets are not fixed against movement with respect to other portions of the spring.

DESCRIPTION OF THE PREFERRED EMBODIMENT

Figure 1:
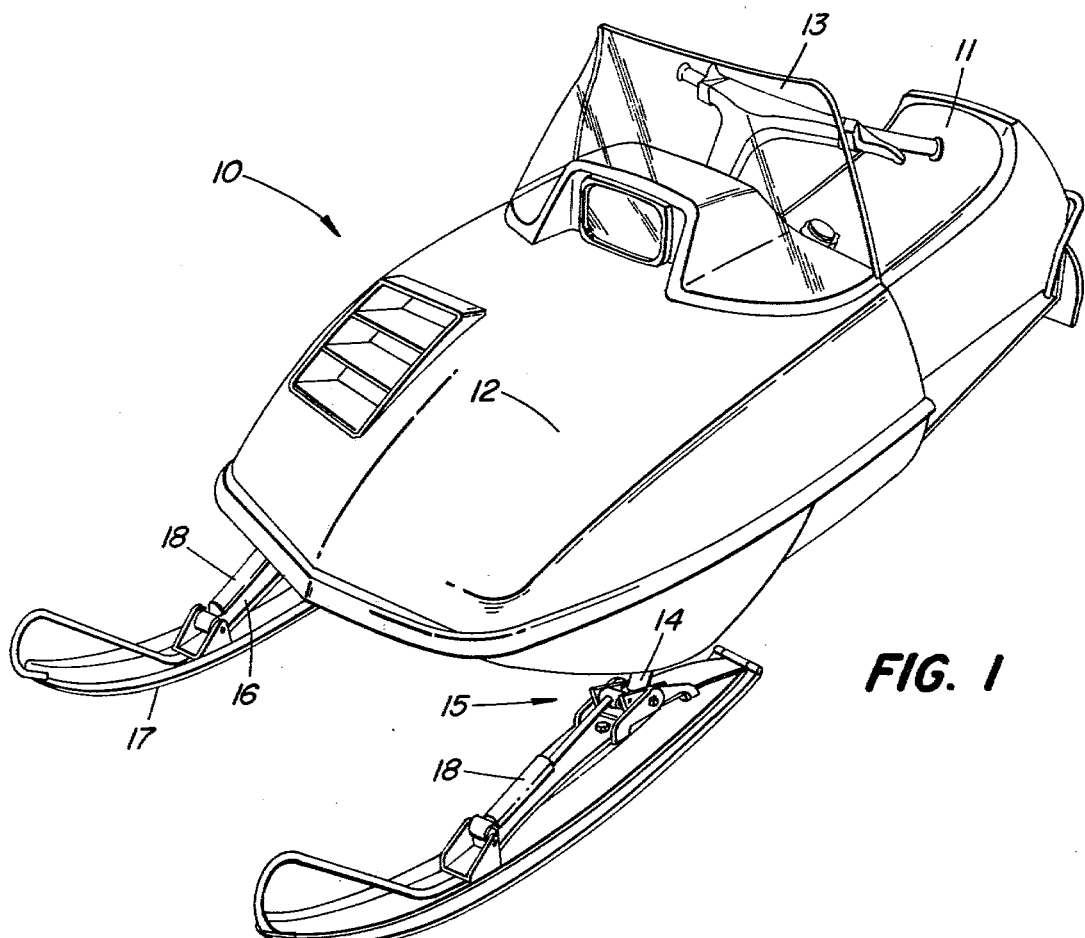
FIG. 1 is a front perspective view of a snowmobile incorporating the features of the present invention.

The snowmobile shown in FIG. 1 is provided with a body 10 having a seat 11 carried thereon that serves as a portion of an operator's station just rearwardly of the main power source, which is an internal combustion engine, contained under the front cowling 12. Provided at the operator's station 11 is a steering column 13, the upper rear end of which includes manual steering control mechanism. The steering column 13 creates turning in a vertically disposed steering post 14, the lower end of which is connected by structure, here indicated in its entirety by reference numeral 15, to the upper portion of a downwardly convexed spring 16. The spring extends fore-and-aft and is connected at its front and rear ends to the steering ski 17. The purpose of the spring 16 is to cushion the body 10 of the snowmobile against bumps when the snowmobile is in operation.

There is normally provided for each snowmobile a left- and right-hand steering post 14, two connecting structures 15, two springs 16, and their associated skis 17. The spring 16, while shown as a single leaf spring, could, if the weight of the snowmobile required such or should the suspension characteristics between the snowmobile and spring require such, be of a conventional type multi-leaf spring. Shock absorbers 18 are provided and extend between the forward end of skis 17 and their respective connecting structure 15.

Figure 2:
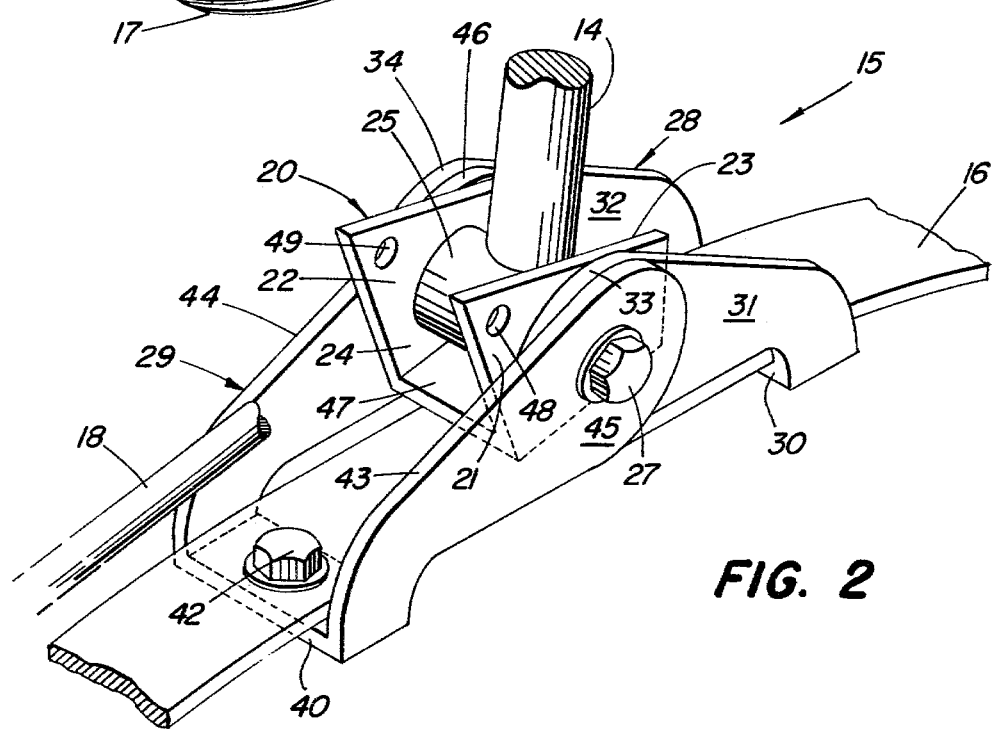
FIG. 2 is an enlarged front perspective view of a portion of the left spring and the structure connecting it to the steering post.

Referring now to FIG. 2, the supporting structure 15 between each post 14 and its respective spring 16 is composed, in part, of a trunnion structure 20, having a pair of vertical fore-and-aft extending side plates or walls 21, 22. The wall 21, 22 are welded at the inner surfaces 23, 24 to opposite ends of a transverse, horizontal trunnion tube 25 having a central horizontal transverse opening that receives a horizontal pin or bolt 27. A pair of identical bracket members 28, 29 are provided for connecting the trunnion 20 to the spring 16. The bracket member 28 has a rear bight portion 30 that underlies the intermediate upper portion of the spring 16 at a location rearwardly of the lower end of the post 14. The bracket member 28 includes opposite vertical walls 31, 32 that project upwardly and forwardly of the underlying or bight portion 30 to forward, upper end portions 33, 34 that lie outboard of the walls or plates 21, 22 respectively and have pin receiving openings through which the bolt 27 extends. The bight portion 30 and the portion of the spring 16 directly above it are provided with aligned openings, not shown, through which a bolt, also not shown, may extend to rigidly hold the bight portion 30 and spring 16 together.

As mentioned, the bracket member 29 is identical to the bracket 28 but extends forwardly of the post 14. The bracket member 29 also has a bight portion 40 that underlies a portion of the spring 16 forwardly of the post 14 and is bolted to that portion of the spring by a bolt and nut combination 42. The bracket member 29 also includes a pair of vertical plates 43, 44 that project along opposite edges of the spring 16 and upwardly and rearwardly from the bight portion 40 to upper and rearwardly positioned end portions 45, 46 that are positioned outboard of the plates 21, 22 and alongside the end portions 33, 34 of the rear bracket 28. The end portions 45, 46 are in a fore-and-aft overlap disposition with respect to the end portions 33, 34. The end portions 45, 46 are also provided with openings 47, 48 through which the bolt 27 may extend. The steering post 14 may be fixed in any of several ways to the tube portion 25 although normally a simple weld is sufficient. The two plates 21, 22 are also interconnected at their lower edges by a lower plate 47 so as to give strength to the entire trunnion structure 20. The outer surfaces of the walls 21, 22 serve as bearing surfaces so that the adjacent respective walls of the bracket members 28, 29 may rock relatively easy to accommodate the bouncing of the snowmobile relative to the ski. As is shown, walls 21, 22 are provided with aligned openings 40, 49 respectively, for connecting the rod end of the shock absorber 18 to the structure 20.

The fore-and-aft spacing between the respective bight portions 30, 40 is relatively large and leaves between them a relatively long expanse of the intermediate portion of the spring 16. The intermediate portion may flex vertically when bouncing of the snowmobile on the respective ski occurs. Such spacing will tend to minimize the effect of flexing at the flex points located near the respective bight portions 30, 40. Also, since the respective brackets 28, 29 may flex about the axis of the pin 27, there will be no restriction against relative vertical movement between the bracket members 28, 29. It should also be noted that the wall portion 31 is inboard of the wall portion 43 and conversely on the opposite side, the wall portion 44 is inboard of the wall portion 32. By having this arrangement of offset positions between the respective walls of the brackets 28, 29 the brackets themselves may be identical regardless of which way they project from the trunnion structure 20. Also, when viewed from the end, the bracket 28 takes on a U-shape appearance with respective side walls 31, 32 forming the legs of the U-shaped member with respect to the bight portion 30. Similarly, the walls 43, 44 form the legs of the U-shaped bracket with respect to the bight portion 40.

I claim:

1. On a snowmobile carried at its forward end on a pair of steering skis and a pair of steering posts mounted on the snowmobile, the improvement residing in the means connecting the posts to the skis comprising: a fore-and-aft extending downwardly convexed leaf spring having opposite end portions connected to and extending upwardly from the respective ski to an intermediate portion beneath the lower end of a respective steering post; a trunnion structure fixed to the lower end of the respective post and having a transverse pin receiving opening; a pair of U-shaped supporting brackets having bight portions positioned under the spring respectively in a spaced forward position with respect to said trunnion structure and a spaced rearward position with respect to said trunnion structure so as to have a relatively long fore-and-aft expanse of the intermediate portion of the spring between the respective bight portions, said brackets further having a first pair of vertical walls inboard and outboard of the spring and extending upwardly and rearwardly from the front bight portion to upper rear portions inboard and outboard respectively of the trunnion structure, and a second pair of vertical walls inboard and outboard of the spring and extending forwardly from the rear bight portion to upper front portion alongside respectively the aforesaid upper rear portions; a transverse pivot pin extending through said upper front and said upper rear portions and through said pin receiving opening so as to hold said trunnion vertically above the intermediate portion of the spring; and means for fixing said bight portions to said spring.

2. On a snowmobile carried at its forward end on a pair of steering skis and a pair of steering posts mounted on the snowmobile, the improvement residing in the means connecting the posts to the skis comprising: a fore-and-aft extending downwardly convexed leaf spring having end portions extending upwardly from the respective ski to an intermediate portion beneath the lower end of a respective steering post; a trunnion structure fixed to each of the lower ends of the respective posts and having a transverse pin receiving opening; a pair of fore-and-aft elongated supporting brackets having horizontal portions positioned adjacent the spring respectively in a spaced forward position with respect to said trunnion structure and a spaced rearward position with respect to said trunnion structure so as to have a relatively long fore-and-aft expanse of the intermediate portion of the spring between the respective horizontal portions, said brackets further having a first fore-and-aft extending portion extending upwardly and rearwardly from the front horizontal portion to an upper rear portion alongside the trunnion structure, and a second fore-and-aft extending portion extending forwardly from the rear horizontal portion to an upper front portion alongside the trunnion; a transverse pivot pin extending through said upper front and said upper rear portions and through said pin receiving opening so as to hold said trunnion vertically above the intermediate portion of the spring; and means connecting the horizontal portions to the spring.

3. A means connecting a steering ski on a snowmobile to a vertically disposed steering post comprising: a fore-and-aft extending downwardly convexed leaf spring having end portions extending upwardly from the ski to an adjoining intermediate portion beneath the lower end of the steering post; a structure fixed to the lower end of the post and having a horizontal pivot; a first fore-and-aft extending bracket having a front end connected to the spring in a spaced forward position with respect to said pivot and extending upwardly and rearwardly from the front end to an upper rear end mounted on said pivot; a second fore-and-aft extending bracket having a rear end connected to the spring and extending upwardly and forwardly from the rear end to an upper front end mounted on the pivot.

4. The invention defined in claim 3 in which there is a large fore-and-aft expanse of the intermediate portion of the spring between said front and rear ends of the first and second brackets respectively and in which said expanse is unincumbered from flexing vertically.

5. The invention defined in claim 3 in which said front and rear ends are characterized by being flat horizontal plates contacting a surface of the spring and are spaced fore-and-aft on the spring to thereby provide a relatively large fore-and-aft expanse of the intermediate portion of the spring between the plates which is generally free to flex vertically.

6. The invention defined in claim 5 in which the flat plates are connected to the spring by bolts that rigidly connect the plates to the spring.

7. The invention defined in claim 5 in which the portion of the first bracket that extends upwardly and rearwardly to an upper rear end is characterized by a pair of vertical walls on opposite sides of the spring that is fixed to said front horizontal plate, and the portion of the second bracket that extends upwardly and forwardly to an upper front end is characterized by a pair of vertical walls on opposite sides of the spring that is fixed to said rear horizontal plate, and the vertical walls of the first bracket and the vertical walls of the second bracket are fore-and-aft overlapped at said rear and front ends respectively; and said pivot is a transverse horizontal pivot pin that extends through both sets of walls at their overlap.

8. The invention defined in claim 7 in which said horizontal plates are in underlying relation to the spring and said walls form U-shaped brackets with the horizontal plates when viewed from the front or rear.

9. The invention defined in claim 7 in which said front and rear brackets are identical with each being in reverse disposition with respect to the other and in which both vertical walls of one bracket at the overlap is disposed inboard of both vertical walls of the other bracket.

* * * * *